W. E. WOODARD AND H. W. SNYDER.
DRIVING WHEEL CENTER.
APPLICATION FILED MAY 4, 1920.
1,380,457.
Patented June 7, 1921.
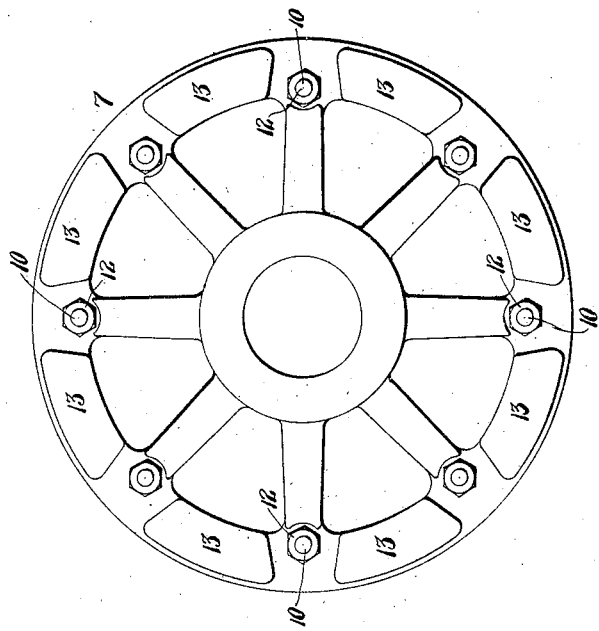
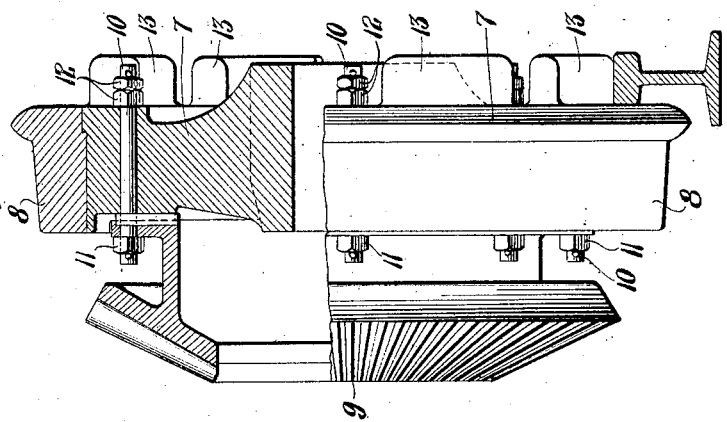
WITNESSES:
Gustav Genzlinger.
INVENTORS
W. E. Woodard
H. W. Snyder
BY
ATTORNEYS

UNITED STATES PATENT OFFICE.

WILLIAM E. WOODARD, OF FOREST HILLS, NEW YORK, AND HERBERT W. SNYDER, OF LIMA, OHIO.

DRIVING-WHEEL CENTER.

1,380,457.            Specification of Letters Patent.       Patented June 7, 1921.

Application filed May 4, 1920. Serial No. 378,752.

*To all whom it may concern:*

Be it known that we, WILLIAM E. WOODARD and HERBERT W. SNYDER, both citizens of the United States, respectively residing at Forest Hills, in the county of Queens and State of New York, and Lima, in the county of Allen and State of Ohio, have invented certain new and useful Improvements in Driving-Wheel Centers, of which the following is a specification.

This invention relates to driving wheel centers particularly for geared locomotives such as the Shay, for example. Considerable difficulty has been experienced in connection with geared locomotives owing to the lack of protection for the rim bolts which secure the gears to the wheel centers. When the wheels leave the rails, the ends of the bolts on the inside of the wheel drop on to the rails and the weight tends to either shear the bolts off or to bend them.

It is the primary object of our invention to overcome the aforementioned difficulty and we accomplish this, together with such other objects as may hereinafter appear, by means of a construction which we have illustrated in preferred form in the accompanying drawings wherein, Figure 1 is an end elevation and partial section of a driver of a Shay locomotive with our improvements applied thereto; and Fig. 2 is a side elevation of the wheel center shown in Fig. 1.

Referring now to the drawings, the reference letter 7 indicates a cast driving wheel center provided with the usual tire 8. The bevel gear 9, through which the wheel is driven is secured to the wheel center by means of rim bolts 10, such bolts being provided with the usual single nut 11 on the outside and the nuts 12 on the inside. The flange of the bevel gear 9 is keyed to the wheel center 7 as is well understood in this art.

In order to protect the inner end of the bolts 10, we cast a plurality of segmental lugs 13 on the inner face of the wheel center, these lugs being on the rim of the wheel center and spaced apart a sufficient distance to permit of the use of the necessary tools for tightening and loosening the nuts 12. When the wheel leaves the rail it will be seen that it will be held up by the lugs 13 instead of coming down on the rim bolts, and thus the latter are fully protected. This is shown in Fig. 1.

We claim:

1. A driver for gear driven locomotives having means projecting laterally from the inner face thereof for protecting the rim bolts in case of derailment.

2. A driver for geared locomotives comprising a driving wheel, a gear, a plurality of rim bolts for securing the gear to the driving wheel and lugs on the rim of the wheel located intermediate rim bolts and extending radially therebeyond.

3. A driver for geared locomotives comprising a wheel, a gear therefor, means for attaching the gear to the wheel, and laterally extending means adapted to take against the rail in case of derailment.

In testimony whereof, we have hereunto signed our names.

WILLIAM E. WOODARD.
HERBERT W. SNYDER.